Aug. 4, 1942.  Y. SEKELLA  2,291,924

ENGINE STARTER DRIVE

Filed Nov. 5, 1940

Witness:
Burr W. Jones

INVENTOR.
BY Youston Sekella
Clinton S. Janes
ATTORNEY.

Patented Aug. 4, 1942

2,291,924

UNITED STATES PATENT OFFICE 2,291,924

ENGINE STARTER DRIVE

Youston Sekella, Elmira Heights, N. Y., assignor to Bendix Aviation Corporation, South Bend, Ind., a corporation of Delaware Application November 5, 1940, Serial No. 364,439

7 Claims. (Cl. 74—7)

The present invention relates to an engine starter drive and more particularly to gearing for automatically connecting a starting motor with a member of an engine to be started.

It is an object of the present invention to provide a novel engine starter drive which is efficient and reliable in operation while being small and compact in construction and economical to manufacture.

It is another object to provide such a device incorporating a yielding driving member of elastically deformable material which is subjected principally to compressive stresses during the driving operation.

It is another object to provide such a device which is adapted to be easily disassembled for inspection or replacement of the parts.

It is another object to provide such a device in which the elastic unit is completely enclosed and protected.

It is another object to provide such a device in which the elastic unit is in the form of a ring which is supported internally in such a manner as to prevent rubbing or scuffing action.

It is another object to provide such a device incorporating novel means for insuring proper engagement of the gearing.

Further objects and advantages will be apparent from the following description taken in connection with the accompanying drawing in which.

Figure 1:
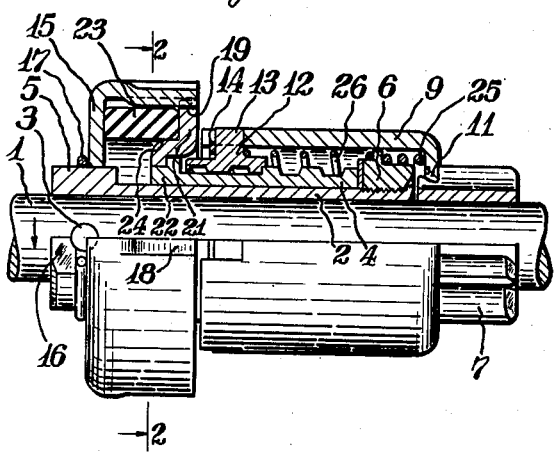
Fig. 1 is a side elevation partly in section of a preferred embodiment of the invention.

In Fig. 1 of the drawing there is illustrated a power shaft 1 which may be the extended armature shaft of a starting motor, not illustrated. A sleeve 2 is fixedly mounted on the power shaft 1 in any suitable manner as by means of a cross pin 3 extending diametrically therethrough. A screw shaft 4 is slidably journalled on the sleeve 2 and is loosely confined thereon between a drive head 5 formed on one end of the sleeve and a stop nut 6 fixedly threaded on the other end thereof.

A pinion 7 is slidably journalled on the power shaft 1 for movement into and out of engagement with a member such as a ring gear 8 of an engine to be started. Means for actuating the pinion from the screw shaft 4 is provided comprising a barrel member 9 rigidly connected at one end to the pinion 7 as indicated at 11, and a nut 12 on the screw shaft fixed in the other end of the barrel in any suitable manner as by means of the tongue and groove connection 13 and lock ring 14.

Figure 2:
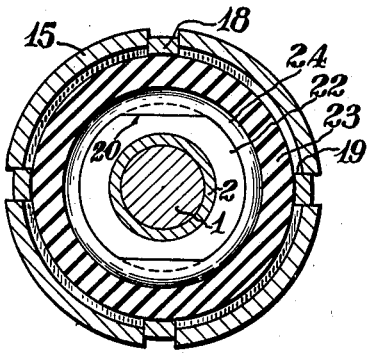
Fig. 2 is a section taken substantially on the line 2—2 of Fig. 1.

A yielding driving connection for the screw shaft 4 from the drive head 5 of sleeve 2 is provided comprising a second barrel member 15 fixed on the drive head 5 as by means of a double-D connection 16 (Fig. 4) and lock ring 17. The periphery of the second barrel member 15 is provided with longitudinal depressions in the form of tongues 18 adapted to engage in grooves 19 formed in the periphery of a flange member 21 which is rigidly mounted as indicated at 20 (Figs. 2 and 3) on a driven head 22 formed on the end of the screw shaft 4. The tongues 18 are slidable in the grooves 19 so as to spline the flange member 21 within the second barrel member 15.

A ring 23 of elastically deformable material such as rubber or the like is loosely mounted in the second barrel member 15 and is arranged to seat on a circular shoulder 24 formed by offsetting the flange member 21 whereby the elastic member is held centralized at all times while being protected from abrasion or scuffing. The dimensions of the parts are such that the elastically deformable member 23 is maintained under slight compression, with the screw shaft 4 bearing against the stop nut 6 on the sleeve 2. The tongues 18 may be formed parallel with the axis of the drive as shown in Fig. 1, or may be formed inclined thereto as shown at 18a in Fig. 3. In the former case, compression of the yielding element takes place without any torsion being applied thereto, whereas in the latter case the elastic element is simultaneously compressed and torqued to an extent depending upon the inclination of the tongues 18.

The threads of the screw shaft 4 preferably terminate adjacent the idle position of the nut 12 as illustrated, whereby the nut may run off the threads to permit overrunning of the pinion 7. A re-entry spring 25 is provided to insure engagement of the nut on the threads of the screw shaft upon actuation of the power shaft 1, and an anti-drift spring 26 is provided for preventing undesired engagement of the pinion with the engine gear.

In the operation of this device, starting with the parts in the positions illustrated in Fig. 1, actuation of the power shaft 1 in the direction of the arrow, causes the sleeve 2 to rotate, and this rotation is transmitted through barrel 15 and flange member 21 to the screw shaft 4. Rotation of the screw shaft causes the nut 12 to thread itself to the right, moving the pinion 7 into engagement with the engine gear 8 until the nut 12 engages the stop nut 6. Thereafter, further rotation of the screw shaft causes it to be threaded backward to the left, compressing the elastic member 23 until sufficient torque is built up to cause the pinion 7 to rotate the engine gear. When the engine starts, acceleration of the gear 8 causes the pinion to overrun and the parts to be thereby returned to their idle positions.

Figure 3:
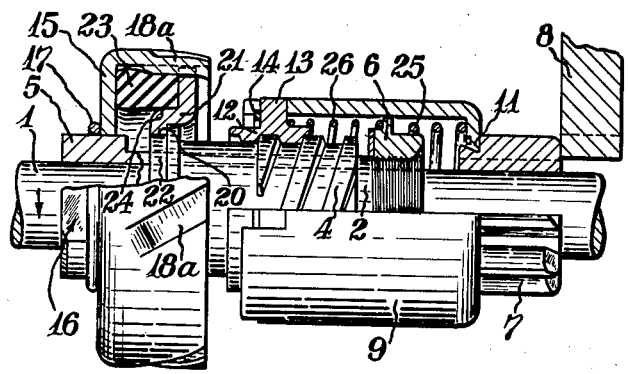
Fig. 3 is a view similar to Fig. 1 of a variant structure, showing the parts in the positions assumed in case of tooth abutment between the pinion and engine gear.
Figure 4:
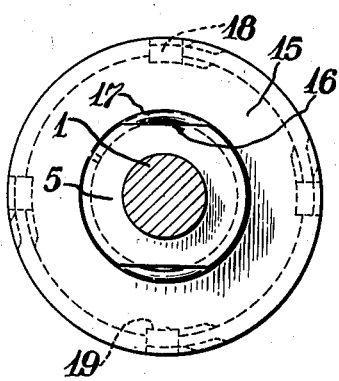
Fig. 4 is an end view from the left in Fig. 3.

In case, during the meshing movement, a tooth of the pinion should abut against a tooth of the engine gear as illustrated in Fig. 3, the screw shaft 4 is caused to move backward against the resistance of the elastic member 23 until sufficient torque is built up to index the pinion into proper registry with the tooth spaces of the engine gear, whereupon the member 23 expands and snaps the pinion into initial mesh and completion of the driving connection and cranking operation take place in the usual manner.

It will be undertsood that various changes may be made in the design and arrangement of the parts without departing from the spirit of the invention as defined in the claims appended hereto.

What is claimed is:

1. In an engine starter drive, a power shaft, a sleeve fixed thereon having a drive head at one end, a screw shaft slidably journalled on the sleeve having a driven head at one end, a pinion slidably journalled on the power shaft, a nut threaded on the screw shaft, a barrel connecting the nut and pinion, a second barrel member fixed on the drive head, a flange member having a splined connection with the second barrel member and fixed on the drive head, and an elastically compressible member in the second barrel member bearing against the flange member.

2. In an engine starter drive, a power shaft, a sleeve fixed thereon having a drive head at one end and a stop member on the other, a screw shaft slidably journalled on the sleeve having a driven head at one end, a pinion journalled on the power shaft, a barrel fixed to the pinion, a nut fixed to the barrel threaded on the screw shaft and adapted to engage the stop member to define the operative position of the pinion, a second barrel member fixed on the drive head, a flange member having a splined connection with the second barrel member and fixed on the driven head, and an elastically compressible member in the second barrel member.

3. In an engine starter drive, a power shaft, a driving barrel member fixed thereto, a screw shaft slidably and rotatably mounted on the power shaft having a flange member splined to the barrel member, a pinion having a threaded connection with the screw shaft, stop means for defining the operative position of the pinion, and elastically compressible means in the barrel resisting longitudinal movement of the flange member.

4. In an engine starter drive, a power shaft, a pinion slidably journalled thereon, and means for actuating the pinion from the power shaft including a screw shaft, a nut threaded thereon, means rigidly connecting the nut to the pinion, an abutment for the nut, and means for connecting the screw shaft to the power shaft including a barrel member fixed to one of said shafts, a flange member fixed to the other of said shafts and splined in the barrel member, and an elastic compression member in the barrel.

5. In an engine starter drive, a power shaft, a pinion slidably journalled thereon, and means for actuating the pinion from the power shaft including a screw shaft, a nut threaded thereon, means rigidly connecting the nut to the pinion, an abutment for the nut, and means for connecting the screw shaft to the power shaft including a barrel member fixed to one of said shafts, a flange member fixed to the other of said shafts and splined in the barrel member, and a ring of elastically deformable material in the barrel, said flange member having an offset portion forming a seat for said ring.

6. In an engine starter drive, a power shaft, a pinion slidably journalled thereon, and means for actuating the pinion from the power shaft including a screw shaft, a nut threaded thereon, means rigidly connecting the nut to the pinion, an abutment for the nut, and means for connecting the screw shaft to the power shaft including a barrel member fixed to one of said shafts having longitudinally extending ribs formed in the interior thereof, a flange member fixed to the other of said shafts having peripheral grooves adapted to slidably receive said ribs, and a ring of elastically deformable material in the barrel, said flange member having a circular shoulder forming a seat for the interior of said ring.

7. In an engine starter drive, a power shaft, a screw shaft slidably mounted thereon, a nut on the screw shaft, a pinion slidably journalled on the power shaft, means rigidly connecting the pinion to the nut, stop means for the nut fixed to the power shaft, and a yielding driving connection between the power shaft and screw shaft including a barrel member fixed to one of said shafts having spiral ribs formed therein, a flange member fixed to the other shaft within the barrel member having peripheral grooves adapted to slidably receive said ribs, and an elastically compressible member in the barrel opposing longitudinal movement of the flange member therein.

YOUSTON SEKELLA.